United States Patent
Tranchina (10) Patent No.: US 8,973,061 B2
(45) Date of Patent: *Mar. 3, 2015

(54) DATA DISTRIBUTION UNIT FOR VEHICLE ENTERTAINMENT SYSTEM

(71) Applicant: Voxx International Corporation, Hauppauge, NY (US)

(72) Inventor: James R. Tranchina, Dix Hills, NY (US)

(73) Assignee: Voxx International Corporation, Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,169

(22) Filed: Apr. 28, 2014

(65) Prior Publication Data

US 2014/0237517 A1 Aug. 21, 2014

Related U.S. Application Data

(63) Continuation of application No. 12/851,433, filed on Aug. 5, 2010, now Pat. No. 8,713,613, which is a continuation-in-part of application No. 12/570,517, filed on Sep. 30, 2009, now abandoned, which is a continuation-in-part of application No. 11/619,240, filed on Jan. 3, 2007, now abandoned.

(60) Provisional application No. 60/756,070, filed on Jan. 4, 2006.

(51) Int. Cl.
*H04N 7/18* (2006.01)
*H04N 21/61* (2011.01)
*B60N 2/48* (2006.01)
(Continued)

(52) U.S. Cl.
CPC .......... *H04N 21/6125* (2013.01); *B60N 2/4876* (2013.01); *G06F 3/147* (2013.01); *H04B 1/082* (2013.01); *H04N 5/4401* (2013.01); *H04N 7/163* (2013.01); *H04N 7/18* (2013.01); *H04N 21/2368* (2013.01); *H04N 21/41422* (2013.01); *H04N 21/4341* (2013.01); *H04N 21/43637* (2013.01); *H04N 21/4382* (2013.01); *H04N 21/4622* (2013.01); *H04N 21/6131* (2013.01); *H04N 21/4126* (2013.01); *B60R 11/0235* (2013.01); *B60R 2011/0017* (2013.01);
(Continued)

(58) Field of Classification Search
None
See application file for complete search history.

(56) References Cited

U.S. PATENT DOCUMENTS 4,681,366 A 7/1987 Lobanoff
4,702,519 A 10/1987 Lobanoff
(Continued)

FOREIGN PATENT DOCUMENTS

DE 202008000289 5/2008
EP 0 510 541 4/1992
(Continued)

OTHER PUBLICATIONS

Arne Hess, "O2 Germany to trial HSDPA+ at 28 Mbit", The Unwired, Feb. 17, 2009.
(Continued)

*Primary Examiner* — Fernando Alcon
(74) *Attorney, Agent, or Firm* — F Chau & Associates, LLC (57) ABSTRACT

A data distribution unit for a vehicle includes a wireless receiver configured to receive coded data wirelessly via a cellular network, a signal processor configured to decode the coded data into video data and audio data, and a wireless transmitter configured to transmit the video data wirelessly to a display and transmit the audio data wirelessly to a speaker.

20 Claims, 3 Drawing Sheets

(51) Int. Cl.

| | | |
|---|---|---|
| *G06F 3/147* | (2006.01) | |
| *H04B 1/08* | (2006.01) | |
| *H04N 5/44* | (2011.01) | |
| *H04N 7/16* | (2011.01) | |
| *H04N 21/2368* | (2011.01) | |
| *H04N 21/414* | (2011.01) | |
| *H04N 21/434* | (2011.01) | |
| *H04N 21/4363* | (2011.01) | |
| *H04N 21/438* | (2011.01) | |
| *H04N 21/462* | (2011.01) | |
| *H04N 21/41* | (2011.01) | |
| *B60R 11/02* | (2006.01) | |
| *B60R 11/00* | (2006.01) | |
| *G06F 3/14* | (2006.01) | |
| *H04N 5/38* | (2006.01) | |

(52) U.S. Cl.
CPC ......... *G06F 3/1423* (2013.01); *G09G 2380/10* (2013.01); *H04N 5/38* (2013.01)
USPC .................................. 725/75; 74/76; 74/77

(56) References Cited

U.S. PATENT DOCUMENTS

| | | |
|---|---|---|
| 4,756,528 A | 7/1988 | Umashankar |
| 4,836,478 A | 6/1989 | Sweere |
| 4,843,477 A | 6/1989 | Mizutani et al. |
| 4,982,996 A | 1/1991 | Vottero-Fin et al. |
| 5,214,514 A | 5/1993 | Haberkern |
| 5,243,415 A | 9/1993 | Vance |
| 5,255,214 A | 10/1993 | Ma |
| 5,267,775 A | 12/1993 | Nguyen |
| 5,367,775 A | 11/1994 | Tong et al. |
| 5,396,340 A | 3/1995 | Ishii et al. |
| 5,410,447 A | 4/1995 | Miyagawa et al. |
| 5,555,466 A | 9/1996 | Scribner et al. |
| 5,610,822 A | 3/1997 | Murphy |
| 5,793,413 A | 8/1998 | Hylton et al. |
| 5,949,345 A | 9/1999 | Beckert et al. |
| 6,058,288 A | 5/2000 | Reed et al. |
| 6,081,420 A | 6/2000 | Kim et al. |
| 6,091,932 A | 7/2000 | Langlais |
| 6,102,476 A | 8/2000 | May et al. |
| 6,133,910 A | 10/2000 | Stinebruner |
| 6,134,223 A | 10/2000 | Burke et al. |
| D438,853 S | 3/2001 | Iino |
| 6,216,927 B1 | 4/2001 | Meritt |
| 6,250,967 B1 | 6/2001 | Chu |
| 6,266,236 B1 | 7/2001 | Ku et al. |
| 6,292,236 B1 | 9/2001 | Rosen |
| 6,300,880 B1 | 10/2001 | Sitnik |
| 6,301,367 B1 | 10/2001 | Boyden et al. |
| 6,317,039 B1 | 11/2001 | Thomason |
| 6,337,913 B1 | 1/2002 | Chang |
| 6,339,455 B1 | 1/2002 | Allan et al. |
| 6,380,978 B1 | 4/2002 | Adams et al. |
| 6,409,242 B1 | 6/2002 | Chang |
| 6,419,379 B1 | 7/2002 | Hulse |
| 6,443,574 B1 | 9/2002 | Howell et al. |
| 6,529,233 B1 | 3/2003 | Allen |
| 6,578,203 B1 | 6/2003 | Anderson, Jr. et al. |
| 6,587,127 B1 | 7/2003 | Leeke et al. |
| 6,669,285 B1 | 12/2003 | Park et al. |
| 6,719,343 B2 | 4/2004 | Emerling et al. |
| 6,724,317 B1 | 4/2004 | Kitano et al. |
| 6,754,183 B1 | 6/2004 | Razavi et al. |
| 6,779,196 B1 | 8/2004 | Igbinadolor |
| 6,871,356 B2 | 3/2005 | Chang |
| 6,899,365 B2 | 5/2005 | Lavelle et al. |
| D515,522 S | 2/2006 | Vitito |
| 7,036,879 B2 | 5/2006 | Chang |
| 7,044,546 B2 | 5/2006 | Chang |
| 7,047,039 B2 | 5/2006 | Lalley |
| 2001/0001083 A1 | 5/2001 | Helot |
| 2001/0044664 A1 | 11/2001 | Mueller et al. |
| 2002/0032048 A1 | 3/2002 | Kitao et al. |
| 2002/0032510 A1 | 3/2002 | Turnbull et al. |
| 2002/0092026 A1 | 7/2002 | Janniello et al. |
| 2002/0105507 A1 | 8/2002 | Tranchina et al. |
| 2002/0186531 A1 | 12/2002 | Pokharna et al. |
| 2003/0021086 A1 | 1/2003 | Landry et al. |
| 2003/0137584 A1 | 7/2003 | Norvell et al. |
| 2003/0184137 A1 | 10/2003 | Jost |
| 2003/0198008 A1 | 10/2003 | Leapman et al. |
| 2003/0229897 A1 | 12/2003 | Frisco et al. |
| 2004/0073932 A1 | 4/2004 | Lavelle et al. |
| 2004/0130616 A1 | 7/2004 | Tseng |
| 2004/0227696 A1 | 11/2004 | Schedivy |
| 2005/0005298 A1 | 1/2005 | Tranchina |
| 2005/0039208 A1 | 2/2005 | Veeck et al. |
| 2005/0044564 A1 | 2/2005 | Stopniewicz et al. |
| 2005/0066369 A1 | 3/2005 | Chang |
| 2005/0099547 A1 | 5/2005 | Vitito |
| 2005/0190792 A1 | 9/2005 | Dunk |
| 2005/0242637 A1 | 11/2005 | Vitito |
| 2006/0050184 A1 | 3/2006 | McMiller et al. |
| 2006/0053453 A1 | 3/2006 | Kasamatsu et al. |
| 2006/0107295 A1 | 5/2006 | Margis et al. |
| 2006/0109388 A1 | 5/2006 | Sanders et al. |
| 2006/0112144 A1 | 5/2006 | Ireton |
| 2006/0174278 A1 | 8/2006 | Kim |
| 2006/0294573 A1 | 12/2006 | Rogers et al. |
| 2007/0130610 A1 | 6/2007 | Aarnio et al. |
| 2011/0032914 A1 | 2/2011 | Venkateswaran et al. |

FOREIGN PATENT DOCUMENTS

| | | |
|---|---|---|
| EP | 1 391 349 | 2/2004 |
| EP | 1494106 | 1/2005 |
| FR | 2 817 812 | 12/2000 |
| FR | 2 829 980 | 3/2003 |
| JP | 2001-047921 | 2/2001 |
| WO | WO 00/38951 | 7/2000 |
| WO | WO 02/074577 | 9/2002 |
| WO | WO 02/087924 | 11/2002 |
| WO | WO 03/029050 | 4/2003 |
| WO | 2005000437 | 1/2005 |
| WO | 2005038628 | 4/2005 |

OTHER PUBLICATIONS

EP Search Report dated Nov. 28, 2011 for PCT/US2007/000153.
English Abstract for Publication No. 2001-047921.
English Abstract for Publication No. WO 02/074577.
English Abstract for Publication No. WO 03/029050.
International Search Report dated May 5, 2011 for International Application No. PCT/US2010/50938.
Written Opinion of the International Searching Authority dated May 5, 2011 for International Application No. PCT/US2010/50938.
Office Action dated Aug. 3, 2010 for U.S. Appl. No. 11/619,240.
Office Action dated Dec. 31, 2009 for U.S. Appl. No. 11/619,240.
QUALCOMM Inc., MediaFLO: FLO Technology Brief, White Paper, 2005, p. 1-8, http://www.qualcomm.com/common/documents/brochures/FLO_Technology_Brief.pdf (last visited Nov. 11, 2009).
Chari, et al., FLO: Physical Layer: An Overview, IEEE Transactions on Broadcasting, vol. 53, No. 1 Mar. 2007, p. 145-159.
Advisory Action dated Mar. 11, 2011 for U.S. Appl. No. 12/570,517.
Office Action dated Dec. 29, 2010 for U.S. Appl. No. 12/570,517.
Office Action dated Jul. 21, 2010 for U.S. Appl. No. 12/570,517.
Notice of Allowance and Fee(s) Due mailed Apr. 4, 2007 from corresponding U.S. Appl. No. 10/438,724, now U.S. Patent No. 7,245,275.
Office Action mailed Jul. 8, 2002 from corresponding U.S. Appl. No. 09/698,918 now abandoned.
Office Action mailed Feb. 11, 2003 from corresponding U.S. Appl. No. 09/698,918 now abandoned.
Office Action mailed Jul. 30, 2003 from corresponding U.S. Appl. No. 09/698,918 now abandoned.

(56) References Cited

OTHER PUBLICATIONS

Office Action mailed Jan. 28, 2004 from corresponding U.S. Appl. No. 09/698,918 now abandoned.
Office Action mailed Oct. 4, 2005 from corresponding U.S. Appl. No. 10/438,724, now U.S. Patent No. 7,245,275.
Office Action mailed Jun. 5, 2006 from corresponding U.S. Appl. No. 10/438,724, now U.S. Patent No. 7,245,275.
Office Action mailed Jun. 16, 2006 from corresponding U.S. Appl. No. 10/688,611.
Office Action mailed Oct. 27, 2006 from from corresponding U.S. Appl. No. 10/688,611.
Office Action mailed Jan. 10, 2007 from corresponding U.S. Appl. No. 10/438,724, now U.S. Patent No. 7,245,275.
Office Action mailed Jul. 13, 2007 from corresponding U.S. Appl. No. 10/688,611.
Office Action mailed Nov. 28, 2008 from corresponding U.S. Appl. No. 11/556,486.
Office Action mailed May 29, 2009 from corresponding U.S. Appl. No. 11/556,486.
Office Action mailed Oct. 6, 2009 from corresponding U.S. Appl. No. 11/556,486.
International Search Report from PCT Application No. PCT/US2004/34371.
Supplementary European Search Report dated Oct. 4, 2010 for Application No. EP06827547.

DATA DISTRIBUTION UNIT FOR VEHICLE ENTERTAINMENT SYSTEM

CROSS-REFERENCE TO RELATED PATENT APPLICATION

This application is a Continuation Application of U.S. application Ser. No. 12/851,433, filed on Aug. 5, 2010, which is a Continuation-in-Part Application of U.S. application Ser. No. 12/570,517, filed on Sep. 30, 2009, which is a Continuation-in-Part Application of U.S. application Ser. No. 11/619,240, filed on Jan. 3, 2007, which claims the benefit of Provisional Application Ser. No. 60/756,070, filed on Jan. 4, 2006, the contents of which are herein incorporated by reference in their entirety.

BACKGROUND OF THE INVENTION

1. Technical Field

The present disclosure relates to a data distribution unit for a vehicle entertainment system and, in particular, to a vehicle and distribution unit that provides a wireless connection to wireless enabled devices in a vehicle.

2. Discussion of the Related Art

As society becomes more mobile and therefore spends a greater amount of time traveling and away from home, demand rises for electronic devices outside the home environment. For example, media units including video screens have been mounted in the headrests of vehicles, facilitating video entertainment on the road. These media units can play video and audio from different media sources located in different portions of the vehicle. Further, many electronic devices used outside the home environment have wireless capability, allowing a user to access the Internet if connected to a wireless network, such as, for example, a Wi-Fi™ network.

Conventional vehicle entertainment systems play the CDs, DVDs, and VHS tapes brought into the vehicle by passengers. However, such systems are limited in their ability to provide a dynamic selection of media choices. Various media, including television, radio and media on the Internet, are available via wireless communications, such as cellular phone networks to cellular phones and personal digital assistants (PDAs). Such media may also be transmitted via other wireless networks over different radio frequencies, including frequencies in the ultra high frequency (UHF) range.

A hotspot is a location where Internet access is available for wireless enabled devices via a wireless local area network. A router connected to a link to an Internet service provider is used to wirelessly distribute Internet protocol (IP) addresses to the wirelessly enabled devices. Hotspots are generally made available by retail or public establishments for their customers.

Therefore, a need exists for a data distribution unit for a vehicle entertainment system which can wirelessly receive media and distribute that media to users of the vehicle, as well as provide a wireless connection to wireless enabled devices in the vehicle.

SUMMARY OF THE INVENTION

In an exemplary embodiment of the present disclosure, a data distribution unit for a vehicle includes a wireless receiver configured to receive coded data wirelessly via a cellular network, a signal processor configured to decode the coded data into video data and audio data, and a wireless transmitter configured to transmit the video data wirelessly to a display and transmit the audio data wirelessly to a speaker.

In an exemplary embodiment, the wireless receiver is configured to receive the coded data wirelessly via a Third Generation (3G) cellular network or a Fourth Generation (4G) cellular network.

In an exemplary embodiment, the wireless receiver is configured to receive the coded data wirelessly via an Evolved High-Speed Packet Access (HSPA+) cellular network, a Worldwide Interoperability for Microwave Access (WiMAX) cellular network, or a Long Term Evolution (LTE) cellular network.

In an exemplary embodiment, the wireless transmitter is configured to transmit the video data and the audio data wirelessly using an 802.11 transmission standard.

In an exemplary embodiment, the wireless transmitter is configured to create a hotspot by assigning an Internet Protocol (IP) address to at least one wireless enabled device via an 802.11 transmission standard.

In an exemplary embodiment, the at least one wireless enabled device comprises one of a laptop, an mp3 player, a gaming system, a personal digital assistant (PDA), or a cellular phone.

In an exemplary embodiment, the display and the speaker are part of a portable media player.

In an exemplary embodiment, the data distribution unit further includes a browser configured to navigate an Internet website on the display.

In an exemplary embodiment, the display is mounted to a headrest of a seat in the vehicle, and the data distribution unit is mounted on a surface within the vehicle. In an exemplary embodiment, the data distribution unit further comprises a video camera configured to record local video data, and a microphone configured to record local audio data.

In an exemplary embodiment, the data distribution unit may be configured to transmit the local audio and video data to a remote device wirelessly via the cellular network, receive remote audio and video data from the remote device wirelessly via the cellular network, and transmit the remote audio data to the speaker and the remote video data to the display wirelessly via an 802.11 transmission standard.

In an exemplary embodiment, the display, the video camera, and the microphone are mounted to a headrest of a seat in the vehicle, and the data distribution unit is mounted on a surface within the vehicle.

In an exemplary embodiment, the display and the video camera are mounted in a dashboard of the vehicle, and the microphone and the speaker are mounted in an overhead of the vehicle.

In an exemplary embodiment, the data distribution unit further includes a plurality of displays, a plurality of video cameras, and a plurality of microphones. A first display, a first video camera and a first microphone are mounted in a dashboard of the vehicle, and a second display, a second video camera and a second microphone are mounted in a headrest of a seat in the vehicle.

In an exemplary embodiment, functions of the first display, the first video camera and the first microphone are controllable by a first controller, and functions of the second display, the second video camera, and the second microphone are controllable by a second controller.

In an exemplary embodiment, the data distribution unit further includes a storage device.

In an exemplary embodiment, local data is stored in the storage device, and the local data is transmitted wirelessly to the display, the speaker, and at least one wireless enabled device via the wireless transmitter using an 802.11 transmission standard.

In an exemplary embodiment, the data distribution unit further includes a data bus, and a selection multiplexer connected to the wireless receiver and an additional media source. The selection multiplexer is configured to multiplex one of data corresponding to the wireless receiver or data corresponding to the additional media source to the data bus.

In an exemplary embodiment, the wireless transmitter is configured to wirelessly transmit the data multiplexed to the data bus to at least one of the display, the speaker, or a wireless enabled device via an 802.11 transmission standard.

In an exemplary embodiment, the data distribution unit further includes an additional wireless transmitter. The wireless transmitter is configured to create a first hotspot having a first access level by assigning an Internet Protocol (IP) address to a first wireless enabled device via an 802.11 transmission standard, and the additional wireless transmitter is configured to create a second hotspot having a second access level, different from the first access level, by assigning an IP address to a second wireless enabled device via the 802.11 transmission standard.

BRIEF DESCRIPTION OF THE DRAWINGS

The above and other features of the present invention will become more readily apparent by describing in detail exemplary embodiments thereof with reference to the accompanying drawings, in which.

DETAILED DESCRIPTION OF EXEMPLARY EMBODIMENTS

Exemplary embodiments of the present invention now will be described more fully hereinafter with reference to the accompanying drawings. This invention, may however, be embodied in many different forms and should not be construed as limited to the embodiments set forth herein.

Embodiments of the invention relate to a data distribution unit for a vehicle entertainment system. For example, the entertainment system includes the data distribution unit and at least one display screen mounted in a vehicle, such as an automobile, minivan or sport utility vehicle (SUV). The display screen may be electrically connected to the data distribution unit for receipt of multimedia content, such as, for example, video, audio and text. Alternatively, the display screen may communicate with the data distribution unit wirelessly. The data distribution unit may further provide a wireless connection to wireless enabled devices in and around the vehicle.

Figure 1:
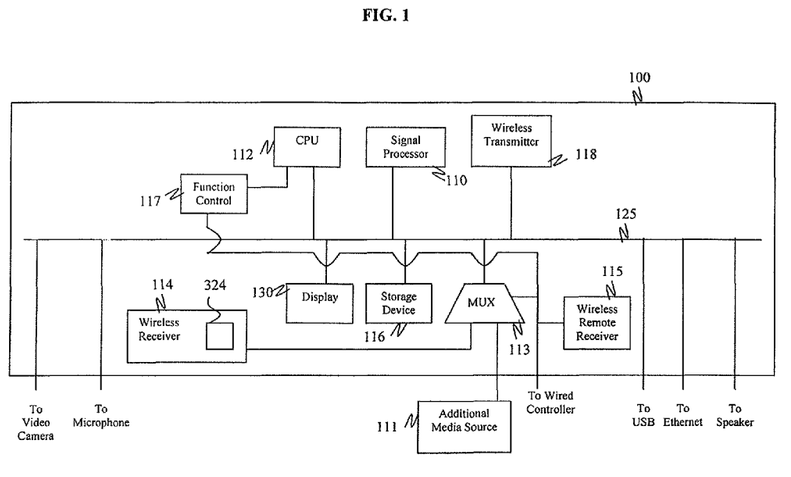
FIG. 1 is a block diagram showing a data distribution unit, according to an embodiment of the present invention.
Figure 2:
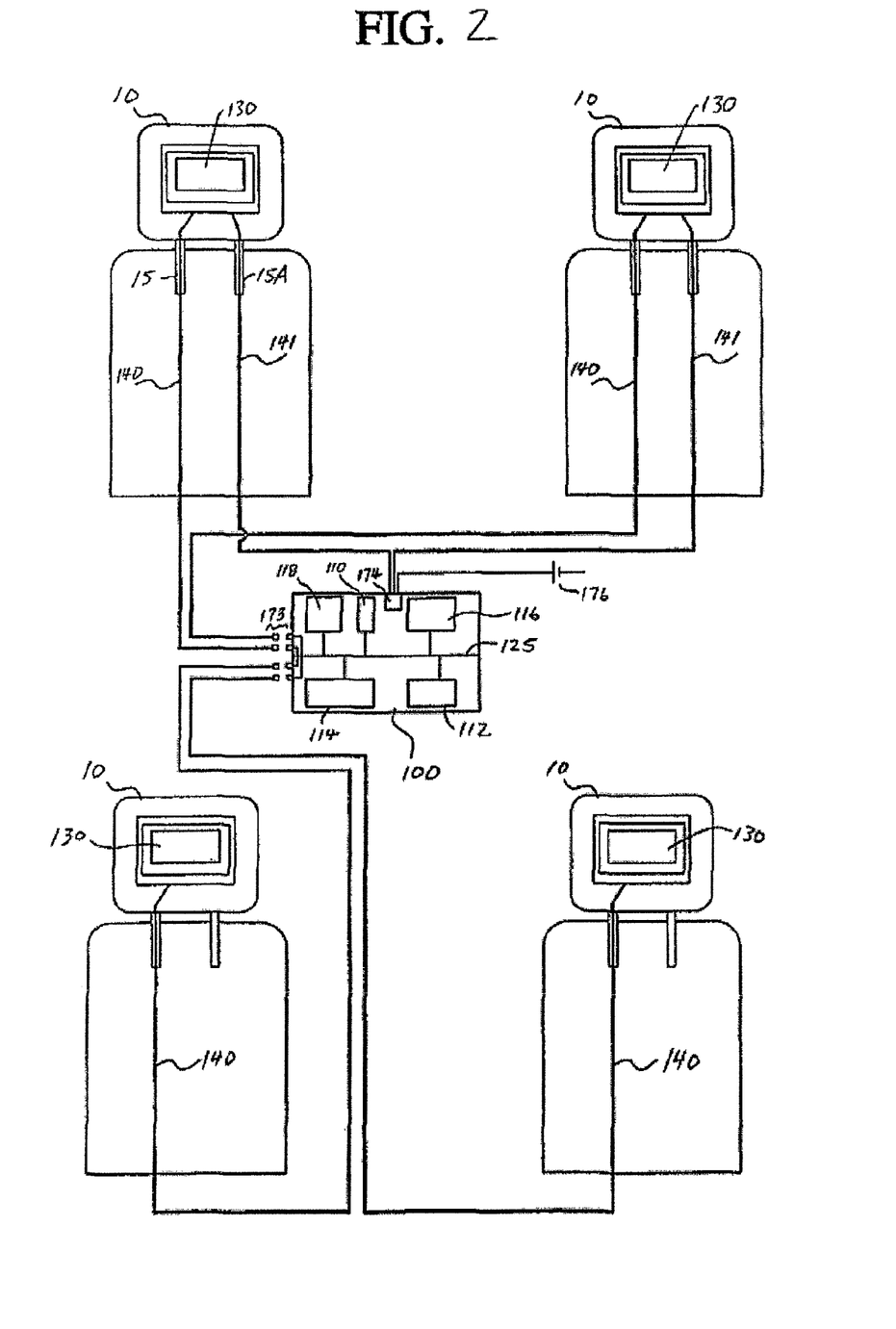
FIG. 2 is a schematic diagram showing connections to the data distribution unit in a vehicle, according to an embodiment of the present invention.

FIG. 1 is a block diagram showing a data distribution unit, according to an embodiment of the present invention; and FIG. 2 is a schematic diagram showing connections to the data distribution unit in a vehicle, according to an embodiment of the present invention.

Referring to FIG. 1, the data distribution unit 100 includes a wireless receiver 114, which receives multimedia data, such as, for example, video, audio, metadata, and text in, for example, JPEG or MPEG formats. Formatting may include compression of the data using, for example, JPEG, MPEG, MPEG-2, MPEG-4, 1-1.264 and AAC+ procedures. Wireless capability may be provided by, for example, a wireless card, which fits into a standard PCMCIA (Personal Computer Memory Card International Association) slot.

The data may be transmitted by any known wireless network, such as satellite or a cellular network, and is preferably transmitted via a wireless network capable of transmitting large volumes of high quality multimedia data to a large number of users, such as, for example, the FLO (forward link only) network provided by QUALCOMM®, Inc. For example, the data distribution unit 100 is similar in function to a cellular mobile device that is capable of receiving and storing multimedia content, such as, for example, a cellular telephone or personal digital assistant (PDA). In an embodiment, the data distribution unit 100 receives multimedia content, including, for example, video programs, via a wireless network. A user of the data distribution unit 100 may be a subscriber to such a system and receive multimedia data in accordance with the terms of the user's subscription.

In different embodiments, a data distribution unit 100 can receive and store data transmitted via various spread spectrum modulation techniques, including, but not limited to, frequency hopping and direct sequence modulation. The varying frequencies utilized by spread spectrum communication techniques result in a high bandwidth for transmitting data to the data distribution unit 100.

The data distribution unit 100 may receive signals transmitted over any frequency in the radio spectrum. In an embodiment of the present invention, the data distribution unit 100 receives signals transmitted via a dedicated spectrum utilizing high power transmission (e.g., 50 kW ERP). For instance, the data distribution unit 100 may receive signals transmitted via frequencies in the upper UHF frequency bands, for example, frequencies ranging from 300 MHz to 3 GHz. Upper UHF frequency bands include various channels that the data distribution unit 100 can receive signals from, including, but not limited to, the frequency band previously allocated to UHF TV channel 55 in the United States (716 MHz-722 MHz).

In an embodiment of the present invention, signals received by the data distribution unit 100 are modulated using orthogonal frequency division multiplexing (OFDM). OFDM is a form of multi-carrier modulation wherein different data streams are modulated onto multiple, parallel sub-carriers on various frequencies within a signal. To obtain a high bandwidth, the sub-carriers are spaced closely together and are orthogonal to one another, resulting in no overlapping or interfering between the sub-carriers. Guard intervals may further be implemented to prevent interference. Upon receiving the OFDM signals, signal processing/conversion facilities 110 located at the data distribution unit 100 demodulate the signals. Guard intervals, if present, are identified, and the multiple data streams of the sub-carriers are demultiplexed. The signal processing/conversion facilities 110 decompress and decode the signals, and the data distribution unit 100 distributes the data to the display device 130 and/or other devices (e.g., speakers, wireless enabled devices). Selected sub-carriers may be demodulated individually, mitigating the effects of interference present with respect to one sub-carrier when demodulating other sub-carriers. Sub-carriers may also be demodulated simultaneously. In another embodiment of the present invention, signals may be transmitted to the data distribution unit 100 using single-carrier modulation techniques.

In an embodiment of the present invention, the data distribution unit 100 receives and stores multimedia data transmitted over the FLO network. The FLO network multicasts a high volume of multimedia data to a large number of devices in a spectrally efficient manner, and is deployed by the Media-FLO™ media distribution system. Currently, the Media-FLO™ media distribution system utilizes the lower frequency band previously allocated to UHF TV channel 55 in the United States (716 MHz-722 MHz). Multimedia data may comprise real-time and non-real-time content, and may be provided by national and local content providers. The multimedia data is reformatted into FLO packet streams, which are sent to FLO transmitters. The FLO packet streams are converted to FLO signals, which are modulated using hierarchical modulation techniques (e.g., OFDM), and the FLO signals are simultaneously transmitted by the FLO transmitters over a single frequency channel to the data distribution unit 100. The FLO transmitters operate at an effective radiated power (ERP) as high as 50 kW. The utilization of a single frequency network allows for the coexistence of local and wide area coverage within a single RF channel. Multimedia content that is of common interest to subscribers in a wide area network is carried by the local area signals, eliminating the need for complex handoffs upon the data distribution unit 100 moving between different coverage areas. The data distribution unit 100 may utilize a Third Generation (3G) cellular network such as, for example, an Evolved High-Speed Packet Access (HSPA+) network, or a Fourth Generation (4G) cellular network such as, for example, a Worldwide Interoperability for Microwave Access (WiMAX) or Long Term Evolution (LTE) network with the MediaFLO™ media distribution system to deliver content, provide interactivity to the user, and facilitate user authorization to the service.

The received multimedia data may be delivered in the form of real-time streaming or stored in a storage device 116 of the data distribution unit 100 for later viewing. The storage device 116 can include, for example, flash memory, a memory card that fits into a PCMCIA slot, a hard drive, a digital video recorder, or any other available storage device. The multimedia data stored in the storage device 116 can be retrieved by a user at any time for playing, for example, on a display, through a stereo system of the vehicle, or on a wireless enabled device. Selection of programming to be played can be made via a wired controller and a wireless remote controller. The wired controller and the wireless remote controller, via a wireless remote receiver 115, are connected to a function control unit 117 in the data distribution unit 100. The function control unit 117 allows a user to control the functions of the data distribution unit 100. Such functions are those typical of a television and entertainment system, and may include, but are not limited to, channel selection, volume control, playback control, and recording control. The wired controller and wireless remote controller may further control functions relating to web/Internet services. The wireless remote receiver 115 receives signals from the wireless remote controller via, for example, radio frequency (RF), infrared (IR), BLUETOOTH, or 802.11 (e.g., 802.11 a/b/g/n) transmission standards. Controls may further be included on the data distribution unit 100.

The received data may require processing prior to being viewed or heard by a user. Accordingly, the data distribution unit 100 is equipped with signal processing/conversion facilities (e.g., a signal processor) 110 for performing signal processing and/or signal conversion. The signal processing/conversion facilities 110 include components, such as demodulators, demultiplexers and decoders to reformat the transmitted audio and video data for display and listening. Such reformatting may include decompression of compressed audio and video data. Demodulators in the signal processing/conversion facilities 110 support, but are not limited to, demodulating signals modulated using Binary Phase-Shift Keying (BPSK), Quadrature Phase-Shift Keying (QPSK), Quadrature Amplitude Modulation (QAM), and layered modulation techniques.

The signal processing/conversion facilities 110 may perform such processing/conversion prior to the signals being provided to the display device 130 or any other device (e.g., speakers, wireless enabled devices). For example, the signal processing/conversion facilities 110 may decode coded data received by the wireless receiver 114. Alternatively, the display device 130 or stereo system can include such signal processing/conversion facilities 110.

The signal processing/conversion facilities 110 may include, but are not limited to, Digital Signal Processors (DSPs), Field-Programmable Gate Arrays (FPGAs), hard-wired digital logic, and facilities for performing encoding/decoding, encrypting/decrypting, compressing/decompressing, analog-to-digital conversion (ADC), digital-to-analog conversion (DAC), and error correction. The signal processing/conversion facilities 110 may further perform Fast Fourier Transforms (FFT) and Inverse Fast Fourier Transforms (IFFT) on received data streams. For example, the signal processing/conversion facilities 110 may implement a FFT to separate multiple data streams carried on the sub-carriers of a received OFDM signal. Such error correction may include, but is not limited to, Cyclic Redundancy Checking (CRC), Error Correction Code or Error Checking and Correcting (ECC), checksum, and so forth.

In many cases, the facilities described above may be implemented by one or more codecs. In other cases, additional and/or other circuitry may be required.

It is to be appreciated that the signal processing/conversion facilities 110 described above with respect to the console may be located separate from or as part of the wireless receiver 114. It is to be further appreciated that one of ordinary skill in the related art will contemplate these and various other facilities for performing signal processing and/or signal conversion, while maintaining the spirit and scope of the invention.

In an exemplary embodiment of the present invention, the data distribution unit 100 includes a wireless transmitter 11R connected to the data bus 125. The wireless transmitter 118 provides a wireless local area network to the wireless enabled devices in and around the vehicle, and can be used in conjunction with the wireless receiver 114 to provide an Internet connection to the wireless enabled devices.

For example, the wireless receiver 114 may establish an Internet connection using cellular technology such as, for example, a 3G or 4G cellular network. The 3G cellular network may include, for example, an HSPA+ network, and the 4G cellular network may include, for example, a WiMAX or LTE network. The Internet connection established by the wireless receiver 114 is shared with the wireless transmitter 118, which assigns an Internet Protocol (IP) address to each of the wireless enabled devices. The IP addresses may be assigned to the wireless enabled devices using, for example, an 802.11 transmission standard (e.g., 802.11 a/b/g/n). The assignment of IP addresses to the wireless enabled devices by the wireless transmitter 118—which transmits data between the wireless receiver 114 and the wireless enabled devices—allows the data distribution unit 100 to function as a hotspot by creating an Internet-enabled wireless local area network (e.g., a Wi-Fi™ network) in and around the vehicle.

In an exemplary embodiment, the data distribution unit 100 may include additional wireless transmitters. The additional wireless transmitters operate in a similar manner to the wireless transmitter 118, as described above. Each additional wireless transmitter may provide a separate wireless local area network. The utilization of separate wireless local area networks allows for a greater coverage area of the hotspot. For example, larger vehicles such as, for example, buses, trains and airplanes may implement additional wireless transmitters to expand the coverage area of a hotspot. Providing separate wireless local area networks also results in the availability of additional bandwidth which can be used to provide Internet access to a large number of wireless enabled devices. Further, separate wireless local area networks may be utilized to offer connections of varying security/access levels for different groups of users.

A wireless enabled device, including, but not limited to, a laptop, mp3 player, gaming system, PDA, or cellular phone (e.g., smartphone), can connect to the wireless local area network via the wireless transmitter 118. Once connected to the wireless local area network, the wireless enabled device can connect to the Internet via the wireless network provided by the wireless receiver 114. The wireless network may be established via a satellite or cellular network such as, for example, a 3G network or a 4G network. The 3G network may include, for example, an HSPA+ network, and the 4G network may include, for example, a WiMAX or LTE network. In an exemplary embodiment, the data distribution unit 100 may further include a Universal Serial Bus (USB) connection or an Ethernet connection, allowing a wired device to establish a wired connection with the data distribution unit 100.

In addition to providing an Internet connection to wireless enabled devices, the wireless transmitter 118 may further provide wireless enabled devices with access to the multimedia data received by and stored in the data distribution unit 100. For example, once connected to the wireless local area network, wireless enabled devices may access the multimedia data received by the data distribution unit's 100 wireless receiver 114, as well as the multimedia data stored in the data distribution unit's 100 storage device 116. This multimedia data may include both real-time and non-real-time content. Wireless enabled devices connected to the data distribution unit 100 via the wireless transmitter 118 may further have access to multimedia data provided to the data distribution unit 100 by an additional media source 111 or any number of additional media sources. Connected wireless enabled devices may access multimedia data stored in the storage device 116 of the data distribution unit 100 while the wireless enabled devices are connected to the Internet or while the wireless enabled devices are not connected to the Internet. Connected wireless enabled devices may also transmit and receive data to and from each other while connected to the wireless local area network.

The wireless local area network provided by the wireless transmitter 118 may utilize an 802.11 transmission standard (e.g., 802.11 a/b/g/n). The wireless transmitter 118 may also utilize various security techniques to provide a secure wireless local area network. For example, the wireless local area network may implement Wired Equivalent Privacy (WEP) security, WiFi™ Protected Access (WPA, WPA2) security, MAC address filtering, port filtering, and the ability to disable Service Set Identifier (SSID) broadcasting. These security settings can be accessed by a user via a user interface, which may be accessible via the display 130 and the wired or wireless remote controller, a wired device in communication with the wireless transmitter 118 via a wired connection (e.g., USB, Ethernet), or a wireless enabled device connected to the wireless local area network via the wireless transmitter 118.

In an exemplary embodiment of the present invention, a video camera and/or a microphone can be connected to the data bus 125 of the data distribution unit 100, as shown in FIG. 1. In another exemplary embodiment, the video camera and/or microphone may be connected to the data distribution unit 100 wirelessly via the wireless transmitter 118 using, for example, radio frequency (RF), infrared (IR), BLUETOOTH, or 802.11 (e.g., 802.11 a/b/g/n) transmission standards. The video camera and microphone can be utilized with a speaker(s), the wireless transmitter 118 and the wireless receiver 114 under control of a central processing unit (CPU) 112 and the signal processing/conversion facilities 110, and when connected to the Internet, may provide Voice over IP (VOIP) and videoconferencing functionality. The speaker(s) may be connected to the data bus 125 of the data distribution unit 100, or the speaker(s) may be wirelessly connected to the data distribution unit 100 via the wireless transmitter 118 using, for example, radio frequency (RF), infrared (IR), BLUETOOTH, or 802.11 (e.g., 802.11 a/b/g/n) transmission standards.

The video camera, microphone and/or speaker(s) may be positioned together or separately, and can be positioned in any number of locations in a vehicle. For example, the video camera, microphone, and/or speaker may be coupled to the display 130 and mounted in a seat, headrest, or overhead of a vehicle, located remote from the display 130, mounted separately in a seat, dashboard or center console, or in any other convenient location of the vehicle. In addition to videoconferencing, the video camera and microphone may be used to record and store video data in the storage device 116.

The wired controller or the wireless remote controller may be used to control functions of the video camera, microphone, display 130 and/or speaker(s). For example, the wired controller or the wireless remote controller can be used to enter and exit VOIP or videoconferencing mode, enable the video camera, microphone, display 130, and/or speaker(s), control the volume of the speaker(s), disable the video camera, microphone, display 130 and/or speaker(s), or change recording options of the video camera and/or microphone.

In an exemplary embodiment, the data distribution unit 100 may communicate with a plurality of video cameras, microphones, displays 130 and/or speakers, and functions of each video camera, microphone, display 130 and/or speaker may be controlled by a separate wired controller or wireless remote controller. The video cameras, microphones, displays 130 and/or speakers may further be controlled by the wireless enabled devices connected to the wireless local area network via the wireless transceiver 118 using, for example, software installed on the wireless enabled devices.

The data distribution unit 100 also includes a CPU 112. The CPU 112 may be used to control and/or interact with any of the elements associated with the unit 100. The elements shown in FIG. 1 may be connected by one or more buses 125.

The display 130 includes a screen for displaying video. The screen is preferably an LCD type display, but may be another type of display, such as, for example, an organic LED or electro-luminescent display. The display 130 may include speakers for outputting audio. Alternatively, speakers may be separately provided as part of the data distribution unit 100, or an electrical or wireless connection can be made to speakers positioned remote from the unit 100. Similarly, the display 130 may be part of the unit 100 or positioned remote from the unit 100, as shown in FIG. 2.

The data distribution unit 100 may be positioned in any number of locations in a vehicle. For example, a unit 100 may be positioned overhead in a vehicle and can be coupled to a flip-down display 130. The unit 100 may also be mounted to a seat, positioned in the dashboard, under a seat, in a trunk or rear portion, or in a center console, or in any other convenient location of the vehicle.

Referring to FIG. 2, a headrest 10 includes a display 130 having a screen for displaying video. The display 130 is connected to the data bus 125 to receive the multimedia signals from the unit 100. The data bus 125 is preferably capable of high bandwidth signal communication, and can be implemented in the form of an optical fiber or copper wire. The data bus 125 carries information such as, for example, video and left and right audio outputs.

A transmit circuit may be disposed at the distal end of the data bus 125, and a receive circuit disposed proximal to the display, to process the audio/video signals for proper transmission or reception of the signals and to facilitate play of the audio/video program at the display.

In an embodiment wherein optical fiber is used as the data bus 125, the transmit and receive circuits perform an optical communication protocol, including electrical to optical conversions, to effect signal communication. An example of an optical communication protocol is the Media Oriented Systems Transport (MOST) protocol.

An optical communication protocol, such as MOST, enables efficient transport of streaming multimedia information. Devices can communicate with each other using a high-speed connection over, for example, plastic optical fiber (POF). For example, audio and video programming can be sent around a network for simultaneous playback at several locations in a vehicle. Dynamic equalization and active noise cancellation on all audio signals flowing around the vehicle is possible because digital data is available to all devices on a network. The optical fiber medium, such as, for example, POF, provides low infrastructure costs while making data impervious to electromagnetic disturbances.

An optical protocol, such as the MOST protocol, defines software interfaces to enable applications running on different devices to communicate and exchange information, and defines a transport mechanism that sets up a link for streaming data between devices. The protocol also defines the hardware interface needed to communicate over optical fiber.

In an embodiment where copper wire is used as the data bus 125, the transmit and receive circuits perform the necessary multiplexing and data conversion known to one of ordinary skill in the art to effect communication of the programs.

As shown in FIG. 2, the displays 130 are connected to the data bus 125 by extension data bus lines 140, and are positioned remote from the unit 100, such as in the headrest 10. Alternatively, the displays 130 may be connected to the data bus 125 wirelessly using, for example, radio frequency (RF), infrared (IR), BLUETOOTH, or 802.11 (e.g., 802.11 a/b/g/n) transmission standards. The remotely positioned display(s) may also be positioned in another part of the vehicle (e.g., overhead, in a center console, in the dashboard). In the embodiment shown in FIG. 2, the unit 100 may be positioned in any convenient location in the vehicle, such as overhead, under a seat, in a center console, in a dashboard, in a trunk, etc.

The data distribution unit 100 may also include an additional media source 111 connected to the data bus 125 via a selection multiplexer 113 for feeding programming to the displays and the wireless enabled devices. For example, the additional media source 111 may be a DVD player, a CD-ROM player, a video game player, a videocassette player, a television tuner, a radio tuner, an MP3 player, a digital video recorder (DVR), and/or a device for playing media supplied from a portable storage device (e.g., a portable hard drive, memory cards, flash memory sticks, key drives, thumb drives). The selection multiplexer 113 is further connected to the wireless receiver 114, allowing the user to choose between displaying media received via the wireless receiver 114 or media provided by the additional media source 111. Such a selection may be made by the user via the wired and wireless remote controller, or via wireless enabled devices connected to the wireless local area network via the wireless transmitter 118. The media selected by the user is multiplexed to the data bus 125 by the selection multiplexer 113.

Audio signals received by the data distribution unit 100 may be sent to displays 130, to a speaker(s) and to the wireless transmitter 118 via the data bus 125. The wireless transmitter 118, using, for example, radio frequency (RF), infrared (IR), BLUETOOTH, or 802.11 (e.g., 802.11 a/b/g/n) transmission standards, can transmit audio to, for example, receivers connected to a vehicle radio, wireless headphones, a display having a speaker(s), or wireless enabled devices connected to the wireless local area network.

In addition to the data bus extension lines 140, wires for ground and power 141 (connected to, for example, a vehicle power supply) are connected from the displays 130 to the unit 100. Further, as an alternative to a single data bus carrying audio and video, multiple buses, such as a video and an audio bus, may be used.

The data bus extension line 140 (e.g., optical fiber or copper wire) is passed through a headrest support 15 routing the data bus extension line 140 from the headrest to elsewhere in the vehicle. Upon routing to, for example, the bottom of a seat, the line 140 can be connected to the data distribution unit 100. Connection to the unit 100 may be supplied by any appropriate connectors capable of carrying high bandwidth, such as, for example, via a universal serial bus (USB) type connection 173.

Referring to FIG. 2, displays 130 in multiple headrests of a vehicle (e.g., in multiple rows of seating) can be linked via lines 140 connected to the data distribution unit 100. Like the data bus 125, the extension lines 140 can carry multiple audio and video signals, and use, for example, optical or copper wire protocols capable of carrying high bandwidth.

Depending on selections made by each user on each display 130, the same or different programs can be simultaneously viewed on each of the displays 130 and each wireless enabled device connected to the wireless local area network.

In an embodiment of the present invention, a centralized power relay 174 located in the data distribution unit 100 supplies power to the unit 100 and each of the displays 130 via respective power lines 141 connected to the power relay 174. The power relay 174 is connected to a main power supply 176, such as a vehicle power source.

Connections to the relay 174 and to a power supply of a vehicle and ground may be supplied via connectors/adaptors known to those of skill in the art. The power and ground wires can be run through the same headrest post 15 as or a different headrest post 15A from the lines 140.

The multimedia content available via the data distribution unit 100 includes, for example, video programs, such as movies, television programs, newscasts, and webcasts, audio programs, and navigation information. In addition, a user can access other data or mediums currently available via wireless networks, including cellular networks and the FLO network, such as, for example, web/Internet services, including e-mail and browsing, telephone service, and text services, such as news, sports, stocks, weather and traffic information. Delivery of programming can be in the form of real-time streaming media or delayed via a background delivery service, wherein data is downloaded and stored for later viewing. The multimedia content may be accessed via the display device 130 or via wireless enabled devices connected to the data distribution unit 100 via the wireless local area network provided by the wireless transmitter 118. The data distribution unit 100 may include a browser that allows a user to navigate Internet websites via the display 130.

In an embodiment of the present invention, the data distribution unit 100 can be permanently mounted and wired to displays in a vehicle. Alternatively, the data distribution unit 100 can be a portable unit that can be moved between vehicles. The portable unit, for example, mounts and electrically connects to a docking station in a vehicle, the docking station being appropriately wired to displays and other components, such as speakers and a power source of the vehicle. A portable unit may be a stand-alone unit, including a display, a video camera, a microphone, and/or a speaker(s), which mounts to a docking station in a vehicle, for example, located overhead in a vehicle. Alternatively, the docking station may be located, for example, in the back of a seat, in a headrest of a seat, in a dashboard or in a center console of a vehicle. A stand-alone unit can include a battery attachment so as to operate outside of the vehicle.

Figure 3A:
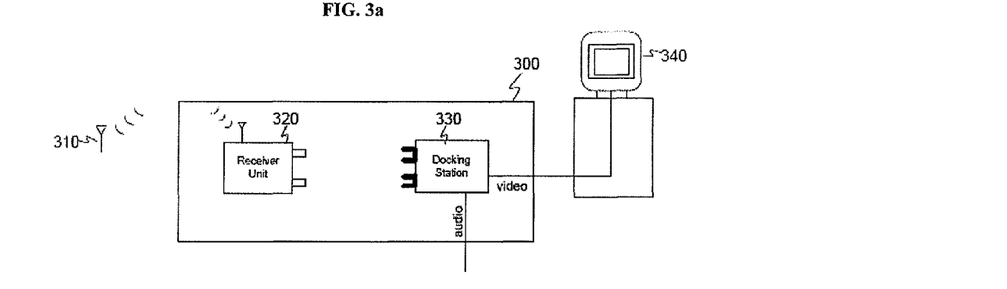
FIGS. 3a, 3b, and 3c illustrate a data distribution unit, according to an exemplary embodiment of the present invention.
Figure 3B:
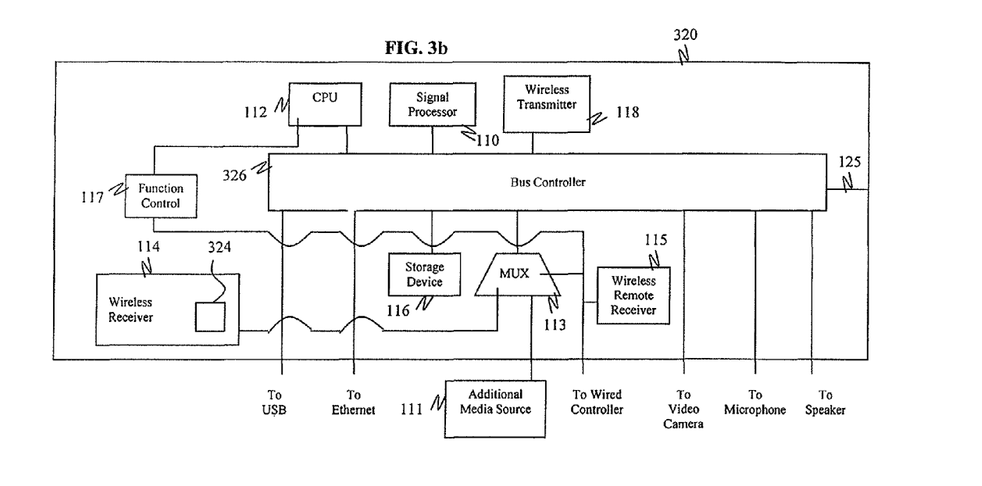
Figure 3C:
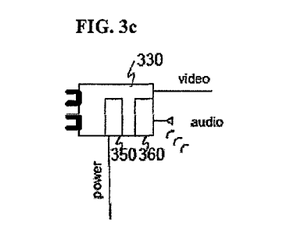

FIGS. 3a, 3b, and 3c illustrate a data distribution unit 300, according to an exemplary embodiment of the present invention. Referring to FIG. 3a, the unit 300 includes a receiver unit 320 and a docking station 330. The receiver unit 320 receives wireless media signals from an external source 310, such as, for example, data from a cellular network (e.g., a 3G or 4G network) or FLO signals from the FLO network. FIG. 3b illustrates an embodiment of the receiver unit 320 which has the same general structure and performs the same receiving and decoding functions as the unit 100 illustrated in FIG. 1, and differs in that it does not include a display. The wireless receiver 114 of the receiver unit 320 additionally includes a buffer 324 for buffering streaming data. The buffer 324 temporarily stores raw unprocessed signals received via the external source 310. For example, the buffer 324 can be used to prevent loss of data which may occur if the signal processing of a current media signal has not completed before a new media signal is received by the wireless receiver 114. The wireless receiver 114 and the additional media source 111 are connected to the selection multiplexer 113, and the selection multiplexer 113, the storage device 116, the CPU 112, the signal processing/conversion facilities 110, and the wireless transmitter 118 are attached to a bus controller 326, which manages the usage of the data bus 125 by the respective units, thereby preventing data collisions. The video camera, microphone, and/or speaker(s) may be attached to the bus controller 326 or wirelessly connected to the receiver unit 320 via the wireless transmitter 118. The receiver unit 320 removably docks to the docking station 330. Although the receiver unit 320 and docking station 330 are illustrated as having respectively, 2 male and 2 female connectors, this is merely to illustrate docking. The receiver unit 320 may be connected to the docking station 330 in a variety of methods known to those skilled in the art. Once the receiver unit 320 processes the incoming media signals, it passes the processed media signals to the docking station 330 for distribution of video signals to one or more displays 340 or connected wireless enabled devices in and around the vehicle and audio signals to one or more sound systems or connected wireless enabled devices in and around the vehicle. Although FIG. 3a illustrates one display, the present invention is not limited thereto, as any number of displays can be supported. The docking station 330 may be wired directly to a sound system of the vehicle.

FIG. 3c illustrates an embodiment of the docking station which may include a centralized power relay 350 and/or a wireless transmitter 360. When the docking station 330 includes the centralized power relay 350, it may provide power to the receiver unit 320, and the one or more displays 340. When the docking station includes a wireless transmitter 360, it may function in a similar manner as the wireless transmitter 118, as described above. For example, the wireless transmitter 360 can transmit and receive data to and from the wireless receiver 114 and wireless enabled devices connected to the wireless local area network, as well as wirelessly transmit the audio signals for reception by a wireless sound system in the vehicle, such as to wireless headphones. The wireless transmitter 360 may use various methods of transmission, such as, for example, radio frequency (RF), infrared (IR), BLUETOOTH, or 802.11 (e.g., 802.11 a/b/g/n) transmission standards. In addition to being utilized with the wireless receiver 114 to create an Internet-enabled wireless local area network, the wireless transmitter 360 may be utilized without the wireless receiver 114 to create a wireless local area network without an Internet connection. Such a network may be used to connect wireless enabled devices to each other.

It should be noted that the units attached to the data bus 125 in FIG. 1 and FIG. 3b are shown in this way for ease of illustration, and there may be intervening circuitry as envisioned by those skilled in the art.

Although exemplary embodiments of the present invention have been described hereinabove, it should be understood that the present invention is not limited to these embodiments, but may be modified by those skilled in the art without departing from the spirit and scope of the present invention, as defined by the appended claims.

What is claimed is:

1. A data distribution system for a vehicle, comprising:
a removable data distribution unit, comprising:
   a wireless receiver configured to receive coded data wirelessly via a cellular network;
   a signal processor configured to decode the coded data into video data and audio data;
   a first wireless transmitter configured to create a first hotspot having a first access level by assigning an Internet Protocol (IP) address to a first wireless enabled device via an 802.11 transmission standard, and further configured to transmit the video data to a display in the vehicle to be displayed; and
   a second wireless transmitter configured to create a second hotspot having a second access level, different from the first access level, by assigning an IP address to a second wireless enabled device via the 802.11 transmission standard; and
a docking station mounted in the vehicle, wherein the removable data distribution unit is configured to removably connect to the docking station.

2. A data distribution system for a vehicle, comprising:
a data distribution unit mounted on a surface within the vehicle, comprising:
a wireless receiver configured to receive coded data wirelessly via a cellular network;
a signal processor configured to decode the coded data into video data and audio data;
a first wireless transmitter configured to transmit the video data wirelessly to a display and transmit the audio data wirelessly to a speaker, and to create a first hotspot having a first access level by assigning an Internet Protocol (IP) address to a first wireless enabled device via an 802.11 transmission standard; and
a second wireless transmitter configured to create a second hotspot having a second access level, different from the first access level, by assigning an IP address to a second wireless enabled device via the 802.11 transmission standard.

3. The data distribution system of claim 2, wherein the data distribution unit further comprises:
a wired connection configured to transmit at least one of the video data and the audio data to a wired device connected to the data distribution unit via the wired connection.

4. The data distribution system of claim 3, wherein the wired connection comprises a USB connection or an Ethernet connection.

5. The data distribution system of claim 2, wherein the data distribution unit further comprises:
a storage device configured to store the video data and the audio data.

6. The data distribution system of claim 2, wherein the display is mounted in the vehicle.

7. The data distribution system of claim 6, wherein the display is mounted to a headrest of a seat in the vehicle.

8. The data distribution system of claim 2, wherein the wireless receiver is configured to receive the coded data wirelessly via a Third Generation (3G) cellular network or a Fourth Generation (4G) cellular network.

9. The data distribution system of claim 2, wherein the wireless receiver is configured to receive the coded data wirelessly via an Evolved High-Speed Packet Access (HSPA+) cellular network, a Worldwide Interoperability for Microwave Access (WiMAX) cellular network, or a Long Term Evolution (LTE) cellular network.

10. A data distribution system for a vehicle, comprising:
a data distribution unit mounted on a surface within the vehicle, comprising:
a wireless receiver configured to receive first data wirelessly from a first hotspot within the vehicle, wherein the first data is received by the first hotspot wirelessly from a cellular network, the first hotspot has a first access level, and the wireless receiver receives the first data from the first hotspot via an 802.11 transmission standard;
a signal processor configured to decode the first data received by the wireless receiver, or second data stored in the data distribution unit, into video data and audio data; and
a wireless transmitter configured to create a second hotspot having a second access level, different from the first access level, by assigning an Internet Protocol (IP) address to at least one wireless enabled device via the 802.11 transmission standard, and further configured to transmit at least one of the video data and the audio data to the at least one wireless enabled device.

11. The data distribution system of claim 10, wherein the data distribution unit further comprises:
a wired connection configured to transmit at least one of the video data and the audio data to a wired device connected to the data distribution unit via the wired connection.

12. The data distribution system of claim 11, wherein the wired connection comprises a USB connection or an Ethernet connection.

13. The data distribution system of claim 10, wherein the data distribution unit further comprises:
a storage device configured to store the second data, wherein the at least one wireless enabled device has access to the second data stored on the storage device.

14. The data distribution system of claim 13, wherein the second data stored on the storage device is received from a wireless network.

15. The data distribution system of claim 10, wherein the at least one wireless enabled device is one of a plurality of wireless enabled devices, and the plurality of wireless enabled devices transmit and receive third data to and from each other via the data distribution unit.

16. The data distribution system of claim 10, further comprising:
at least one display mounted in the vehicle, wherein the data distribution unit is configured to transmit at least one of the video data and the audio data to the at least one display.

17. The data distribution system of claim 16, wherein the at least one display is mounted to a headrest of a seat in the vehicle.

18. The data distribution system of claim 10, further comprising:
a docking station mounted in the vehicle, wherein the data distribution unit is configured to removably connect to the docking station.

19. The data distribution system of claim 10, wherein the first data is received by the first hotspot wirelessly via a Third Generation (3G) cellular network or a Fourth Generation (4G) cellular network.

20. The data distribution system of claim 10, wherein the first data is received by the first hotspot wirelessly via an Evolved High-Speed Packet Access (HSPA+) cellular network, a Worldwide Interoperability for Microwave Access (WiMAX) cellular network, or a Long Term Evolution (LTE) cellular network.

* * * * *